United States Patent [19]

Koyanagi et al.

[11] Patent Number: 5,880,782
[45] Date of Patent: Mar. 9, 1999

[54] SYSTEM AND METHOD FOR CONTROLLING EXPOSURE OF A VIDEO CAMERA BY UTILIZING LUMINANCE VALUES SELECTED FROM A PLURALITY OF LUMINANCE VALUES

[75] Inventors: Masakazu Koyanagi; Tadafusa Tomitaka, both of Chiba, Japan

[73] Assignee: Sony Corporation, Tokyo, Japan

[21] Appl. No.: 578,076

[22] Filed: Dec. 27, 1995

[30] Foreign Application Priority Data

Dec. 30, 1994 [JP] Japan ..................................... 6-339624

[51] Int. Cl.[6] .......................... H04N 5/225; H04N 5/235; H04N 5/238

[52] U.S. Cl. .......................... 348/364; 348/169; 348/229; 348/234; 348/256; 358/520; 396/233

[58] Field of Search ..................................... 348/222, 223, 348/224, 225, 229, 234, 235, 236, 237, 362, 363, 364, 365, 366, 169, 255, 256; 396/233, 234, 242, 243; 358/518, 520; 382/162, 167; H04N 5/235, 5/238, 5/225

[56] References Cited

U.S. PATENT DOCUMENTS

| | | | |
|---|---|---|---|
| 4,427,996 | 1/1984 | Eiji | 358/228 |
| 4,701,626 | 10/1987 | Ishizaki et al. | 250/578 |
| 5,128,769 | 7/1992 | Arai et al. | 358/228 |
| 5,194,960 | 3/1993 | Ota | 358/228 |
| 5,272,538 | 12/1993 | Hideo et al. | 358/228 |
| 5,347,371 | 9/1994 | Ryuji et al. | 358/453 |
| 5,353,058 | 10/1994 | Takei | 348/363 |
| 5,412,487 | 5/1995 | Ryuji et al. | 358/452 |
| 5,703,644 | 12/1997 | Mori et al. | 348/363 |

*Primary Examiner*—Wendy Garber
*Assistant Examiner*—Ngoc-Yen Vu
*Attorney, Agent, or Firm*—Frommer Lawrence & Haug, LLP.; William S. Frommer; Dennis M. Smid

[57] ABSTRACT

A video camera system and method for automatically controlling the exposure of a desired object image. A plurality of average luminance values are respectively determined by a plurality of light measurement units. A plurality of reference luminance values are obtained from a plurality of reference value circuits. Selected ones of the average luminance values and the reference luminance values are utilized to form control signals. Such control signals control the video camera so as to maintain a proper exposure of the desired object.

30 Claims, 7 Drawing Sheets

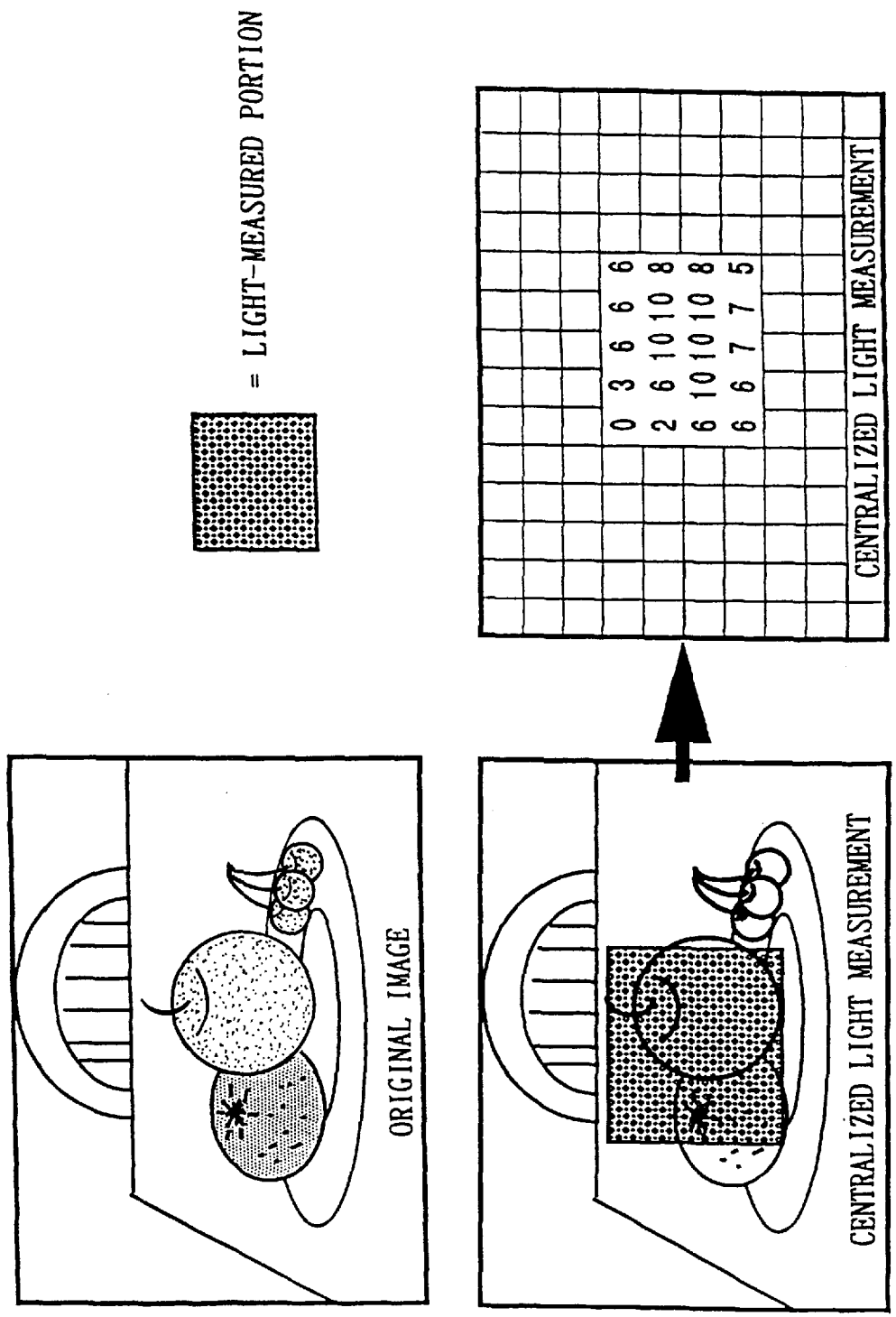

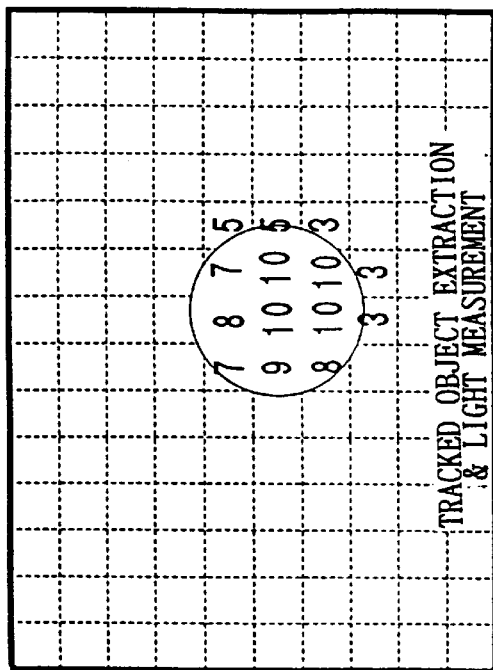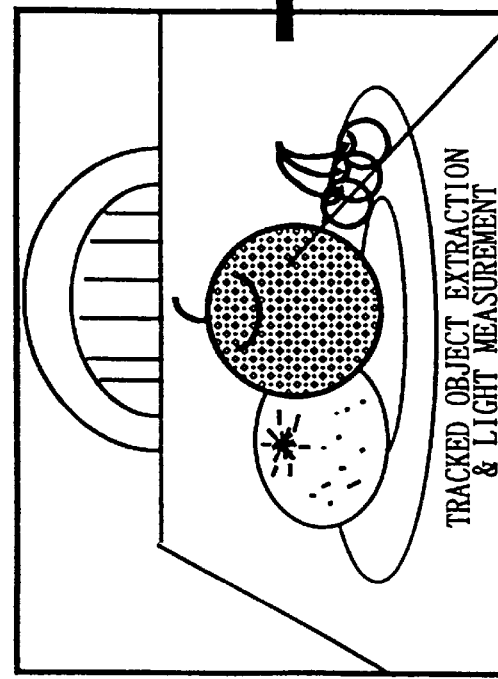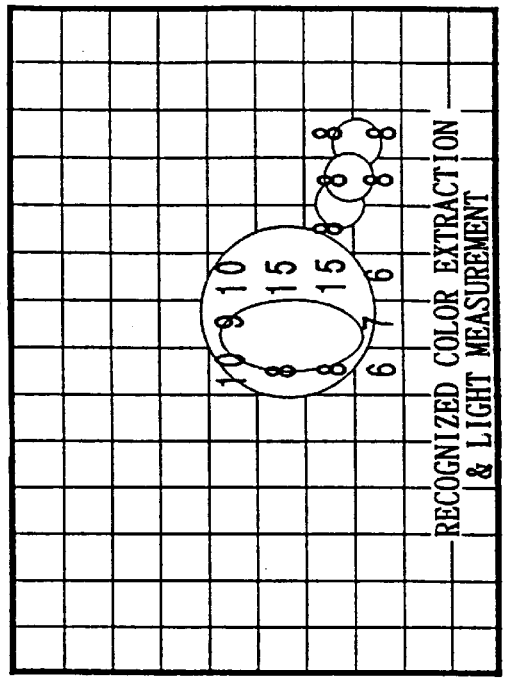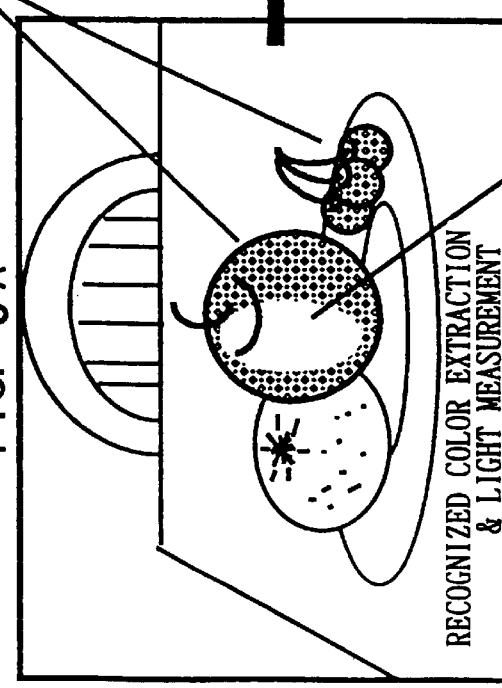
FIG. 5A TRACKED OBJECT EXTRACTION & LIGHT MEASUREMENT
FIG. 5B TRACKED OBJECT EXTRACTION & LIGHT MEASUREMENT
FIG. 5C RECOGNIZED COLOR EXTRACTION & LIGHT MEASUREMENT
FIG. 5D RECOGNIZED COLOR EXTRACTION & LIGHT MEASUREMENT

`5,880,782`

SYSTEM AND METHOD FOR CONTROLLING EXPOSURE OF A VIDEO CAMERA BY UTILIZING LUMINANCE VALUES SELECTED FROM A PLURALITY OF LUMINANCE VALUES

BACKGROUND OF THE INVENTION

The present invention relates to a video camera technique for automatically following a change of an object in the field of view of a video camera and, more particularly, to such technique for controlling the exposure so as to properly adjust the luminance of the object.

Numerous methods may be employed for controlling the exposure of a video camera. For example, such methods may include an automatic multi-split light measurement exposure control method, an automatic centralized or spot light measurement exposure control method, a manual exposure control method and so forth.

The automatic multi-split light measurement exposure control method utilizes a multi-split light measurement pattern to measure luminance information obtained from picture information. The measured luminance information may be processed to obtain an average value, a distribution, and/or a histogram of such luminance information which may be utilized to control exposure.

The automatic centralized or spot light measurement exposure control method utilizes a light measurement pattern which may be respectively located in or around the center portion of a screen and in a relatively small or spot area in or around such center portion. Luminance information obtained from picture information is measured by use of the light measurement pattern which may be utilized to control exposure.

In the manual exposure control method, an operator or cameraman may determine and/or manually adjust the luminance of an object to be photographed to obtain a desired or acceptable value.

Each of the above-mentioned exposure control methods has disadvantages associated therewith. For example, the automatic multi-split light measurement exposure control method may have difficultly in obtaining a proper exposure of an object in a scene having a relatively large luminance difference between the object and its background (such as in a scene having a backlight or excessive normal light). In such situation, the background information may be incorporated with information of the object to be photographed, thereby making it difficult to obtain a proper exposure of the object. Further, with regard to the automatic centralized or spot light measurement exposure control method, such method may be difficult to use when the object to be photographed is moving. That is, in such method, the operator or cameraman has to photograph the object such that it is always located at the center of a screen. As is to be appreciated, it may be difficult to continuously photograph the object so as to keep it centered on the screen while the object is moving. Furthermore, with regard to the manual exposure control method, an operator may not be able to properly adjust the exposure control in response to a sudden luminance change of an object. Additionally, a problem may arise in that the background may not be set to an optimum luminance level when an object suddenly disappears from a photographing screen.

OBJECTS AND SUMMARY OF THE INVENTION

An object of the present invention is to provide a system and method for properly controlling the exposure of a video camera for an object to be photographed.

Another object of the present invention is to provide a system and method as aforesaid in which luminance values are selected from among a plurality of luminance values and in which the selected luminance values are utilized to control the exposure of the video camera.

A further object of the present invention is to provide a system and method as aforesaid in which the plurality of luminance values include a plurality of average luminance values each calculated by a respective technique and at least one reference luminance value.

In accordance with an aspect of the present invention, a video camera system is provided. Such system comprises a picture information temporary storage device having a temporary memory for dividing a video signal obtained from at least one video camera into luminance information and color information and for storing picture information composed of the luminance information and the color information in the temporary memory at an arbitrary timing; an object recognizing and tracking device for recognizing, extracting and tracking a displayed object from the picture information stored in the temporary memory; a tracked object initialization device for storing characteristic values of the tracked object; a tracked object extraction and light measurement device for extracting and integrating only the luminance information of the tracked object and for calculating an average value; a recognized color extraction and light measurement device for extracting color information having the same color as the recognized object, integrating the corresponding luminance information, and calculating an average value; a centralized light measurement device for integrating the luminance information of the object in or around the center portion of a screen and calculating an average value; a spot light measurement device for integrating the luminance information in a relatively small area in or around the center portion of the screen and calculating an average value; a light-measuring method selection device for selecting the luminance information measured by the tracked object extraction and light measurement device, the recognized color extraction and light measurement device, the centralized light measurement device or spot light measurement device in accordance with the object condition; and an exposure control device for controlling an iris and/or an automatic gain controller of the video camera and adjusting the luminance of an output object to a constant value by using a selected luminance average value and a luminance reference value.

In accordance with another aspect of the present invention, a video camera exposure control method is provided. Such method comprises dividing a video signal obtained from a video camera into luminance information and color information and storing picture information including the luminance information and the color information in a temporary memory at an arbitrary timing; recognizing, extracting and tracking a displayed object from the picture information stored in the temporary memory; storing characteristic values of the tracked object; extracting and integrating only the luminance information of the tracked object and calculating a first average value; extracting color information having the same color as the recognized object, integrating the corresponding luminance information, and calculating a second average value; integrating the luminance information of the object around the center portion of a screen and calculating a third average value; integrating the luminance information in a relatively small area around the center portion of the screen and calculating a fourth average value; selecting the luminance information of the first average value, the second average value, the third average value or the fourth average value in accordance with the object condition; and controlling an iris and/or an automatic gain controller of the video camera and adjusting the luminance of an output object to a constant value by using the selected luminance average value and a luminance reference value.

The luminance information and color information stored in the picture information temporary storage device may be read out and supplied to the centralized light measurement device or spot light measurement device, the recognized color extraction and light measurement device, the object recognizing and tracking device, and the tracked object extraction and light measurement device in accordance with a command signal which may be supplied by the light-measuring method selection device. The recognized color extraction and light measurement device calculates a luminance average value of pixels having information which is relatively close to the recognized color. The object recognizing and tracking device and the tracked object extraction and light measurement device extract only the recognized object and calculate its average luminance value. The centralized light measurement device or spot light measurement device calculates a average luminance value of a center portion of a screen or in a relatively small area of such center portion, respectively. The light-measuring method selection device determines or selects a luminance average value from among the calculated luminance average values in accordance with the object condition or present operating conditions, and further selects a reference value. The selected luminance average value and reference value may be compared by the exposure control device so as to obtain a signal which may be utilized to properly adjust the luminance value of an object.

Other objects, features and advantages of the present invention will become apparent from the following detailed description of the illustrated embodiments when read in conjunction with the accompanying drawings in which corresponding components are identified by the same reference numerals or characters.

BRIEF DESCRIPTION OF THE DRAWINGS

FIG. 4A is a diagram of an image to which reference will be made in explaining light measurement methods;

FIGS. 4B and 4C are diagrams to which reference will be made in explaining light measurements performed by the centralized light measurement device of the video camera system of FIG. 1;

FIGS. 5A to 5D are diagrams to which reference will be made in explaining light measurements performed by other devices of the video camera system of FIG. 1;

DESCRIPTION OF THE PREFERRED EMBODIMENTS

Preferred embodiments of the present invention will now be described with reference to the accompanying drawings.

Figure 1:
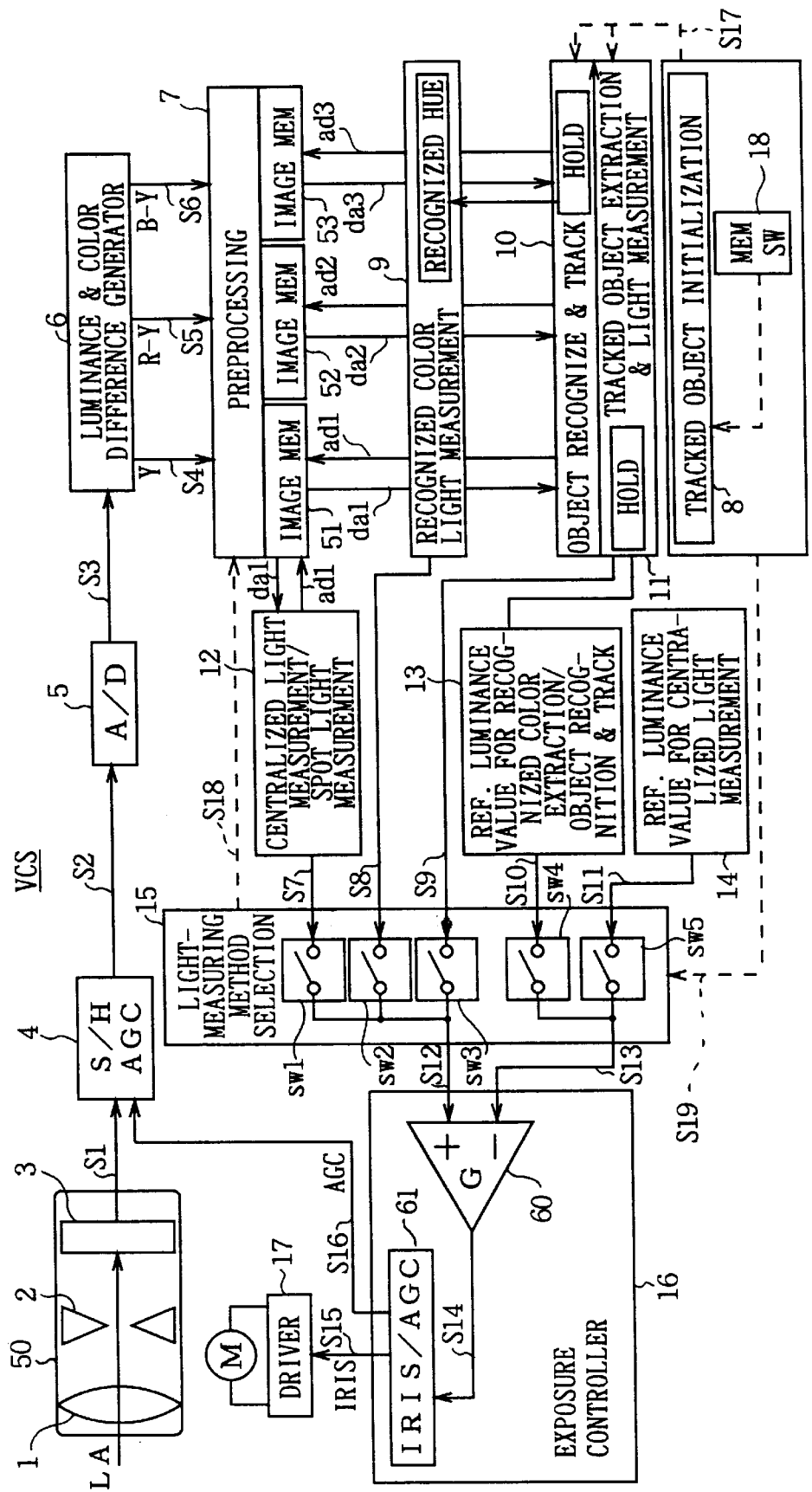
FIG. 1 is a diagram of a video camera system for performing object recognition and automatic exposure adjustment according to an embodiment of the present invention.

FIG. 1 illustrates a video camera system (VCS) which is adapted to perform object recognition and automatic exposure adjustment. As shown therein, such VCS generally includes a lens block section 50, a sample and hold (S/H) and automatic gain control (AGC) circuit 4, an analog-to-digital (A/D) circuit 5, a luminance and color difference signal generator 6, an image temporary memory 7, a recognized color extraction and light measurement unit 9, an object recognizing and tracking unit 10, a tracked object extraction and light measurement unit 11, a tracked object initialization unit 8, a centralized light measurement/spot light measurement unit 12, a light-measuring method selector 15, an exposure controller 16 and a driver 17 which are connected as shown. The lens block section 50 includes a lens 1, an iris 2 and a solid pickup or charge coupled device (CCD) 3.

Image pickup light LA from an object is supplied through the lens 1 and the iris 2 to the CCD 3, whereupon a pickup signal S1 which represents a field-of-view picture is generated and supplied to the S/H and AGC 4. The S/H and AGC is adapted to sample and hold the received pickup signal S1 and to perform or adjust the gain thereof in accordance with an AGC control signal S16 from the exposure controller 16 so as to produce a pickup signal S2. Such pickup signal S2 is converted to a digital pickup signal S3 by the A/D converter 5. The digital pickup signal S3 is supplied to the luminance and color difference signal generator 6.

The luminance and color difference signal generator 6 is adapted to receive the digital pickup signal S3 and to generate therefrom a luminance (Y) signal S4, a color difference (R−Y) signal S5 and a color difference (B−Y) signal S6. Such luminance and color difference signals are supplied to the image temporary memory 7, whereupon they are respectively preprocessed as an object tracking detection signal and an object luminance light-measuring signal. Such preprocessing may include a thinning out operation in which the number of samples of the luminance data are decreased, whereupon the total number of data bits processed are reduced thereby reducing or improving the sampling frequency and/or processing speed. The preprocessed signals are stored in an image memory or memories. That is, three image memories 51, 52 and 53 may be utilized, wherein the luminance picture information is stored in the image memory 51, the color difference (R−Y) picture information is stored in the image memory 52, and the color difference (B−Y) picture information is stored in the image memory 53. Such stored picture information may be randomly-accessed by the centralized light measurement/spot light measurement unit 12, the recognized color extraction and light measurement unit 9, the object recognizing and tracking unit 10, and the tracked object extraction and light measurement unit 11. More specifically, when stored picture information is desired, the unit requesting such information supplies a signal, such as an address signal (ad1, ad2 or ad3) which indicates the address or location of the desired stored picture information, to the image memories. As a result, the requested information is supplied to the respective unit by way of signal da1, da2 or da3. As an example, consider the situation in which the centralized light/spot light measurement unit 12 wishes to obtain the stored luminance picture information from the image memory 51. In such situation, the unit 12 supplies a request or address signal ad1 to the image memory 51, whereupon signal da1 having the requested luminance picture information is supplied to the unit 12.

Figure 2:
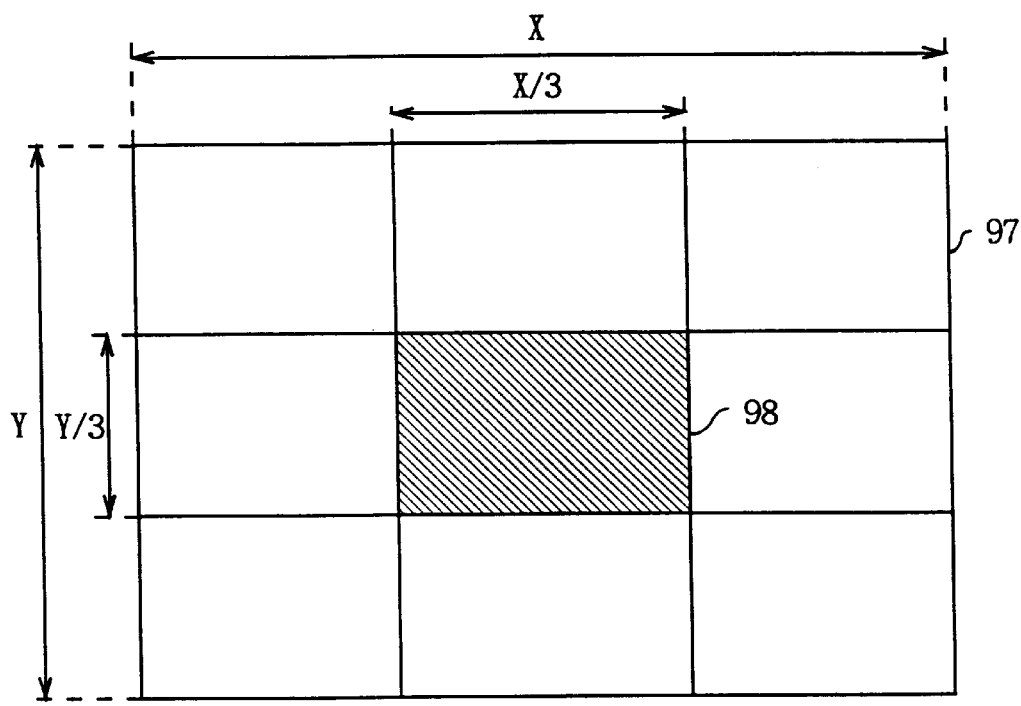
FIG. 2 illustrates a section of an image screen wherein a centralized light measurement device of the video camera system of FIG. 1 performs luminance integrating and average value calculating.

The centralized light measurement/spot light measurement unit 12 receives the requested stored luminance picture information from the image temporary memory 7, as previously described, and generates therefrom an average value of the luminance information contained within a predetermined portion. For example, the centralized light measurement/spot light measurement unit 12 may generate an average value of the luminance information in a center portion 98 of an image screen 97 which is indicated by a cross-hatched or shaded portion in FIG. 2. In this example, the center portion or area 98 has a size of X/3×Y/3, in which the horizontal dimension of the screen 97 is X and the vertical dimension of the screen is Y. As is to be appreciated, other sizes of such center portion may be utilized. The centralized light measurement unit 12 supplies the generated average value of the center luminance information (which may be referred to as a centralized light measurement) as an output signal S7 to one terminal of a switch sw1 of the light-measuring method selector 15.

An example of the procedure performed by the centralized light measurement unit 12 is illustrated in FIGS. 4A, 4B and 4C. That is, FIG. 4A illustrates a image on which the unit 12 is to determine an average value of the center luminance information. The light measured or center portion of such image is indicated as a shaded area in FIG. 4B. The information contained within this shaded area is processed by the unit 12 so as to determine the centralized light measurement or average luminance levels (light values) as illustrated in FIG. 4C.

Figure 3:
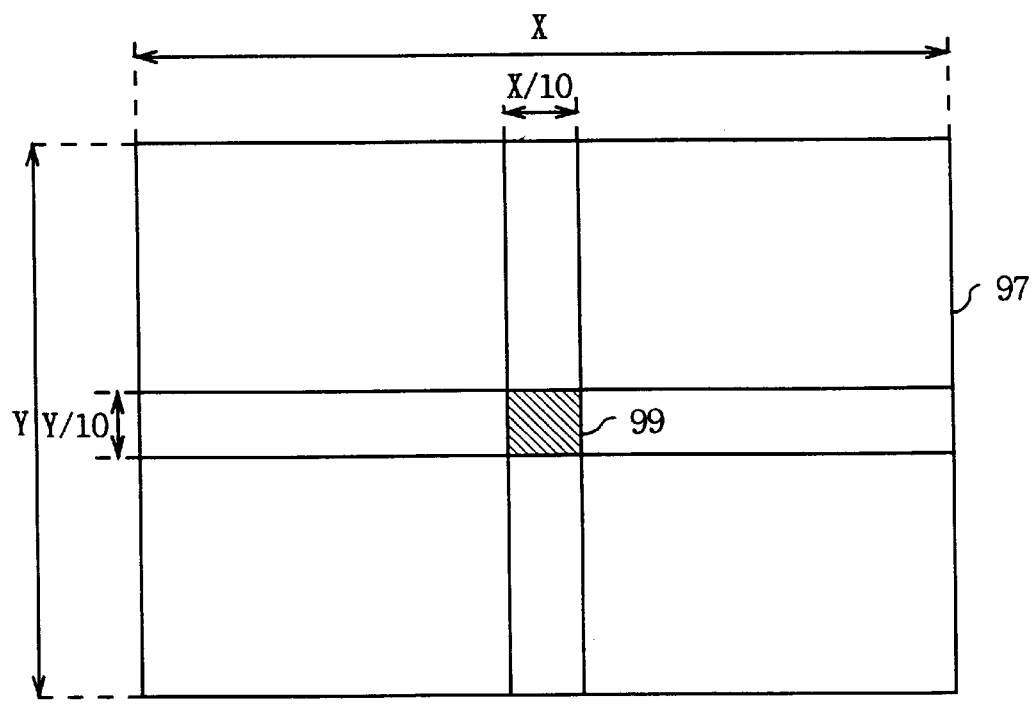
FIG. 3 illustrates a section of an image screen wherein a spot light measurement device of the video camera system of FIG. 1 performs luminance integrating and average value calculating.

The centralized light measurement unit/spot light measurement unit 12 may further generate an average value of the luminance information obtained from the signal da1 pertaining to a relatively small predetermined portion or spot of the image screen 97. Such predetermined portion may be at the center portion of the image screen 97 as, for example, indicated by a shaded portion 99 in FIG. 3. In this example, and in a manner similar to that previously described with reference to FIG. 2, the unit 12 determines an average value of the luminance information contained within the center portion or area having a size of X/10×Y/10 (in which the horizontal dimension of the screen 97 is X and the vertical dimension of the screen is Y). Such area 99 is smaller or narrower than the area 98 of FIG. 2. As is to be appreciated, other sizes of the spot area may be utilized. The spot light measurement unit 12 supplies the generated average value of the center spot luminance information (which may be referred to as a spot light measurement) as the output signal S7 to one terminal of the switch sw1 of the light-measuring method selector 15.

In response to a request, the object recognizing and tracking unit 10 may receive the luminance information signal da1 and the color difference information signals da2 and da3 from the image temporary memory 7. The object recognizing and tracking unit 10 may further receive an instructing or trigger signal S17. In response to such signal S17, the object recognizing and tracking unit 10 extracts and holds characteristic values or information, which may include position information, of a desired object contained within the image represented by the respective luminance and color difference signals in a hold area of the unit 10. The hue of such object, or recognized hue, is supplied to the recognized color extraction and light measurement unit 9.

The tracked object extraction and light measurement unit 11 may receive an instructing signal S17 and information pertaining to the recognized and tracked object from the object recognizing and tracking unit 10. The tracked object extraction and light measurement unit 11 may integrate only the luminance information of the object extracted by the object recognizing and tracking unit 10 and average the same so as to form an average value S9. Such average value S9 is supplied from the tracked object extraction and light measurement unit 11 to one terminal of a switch sw3 of the light-measuring method selector 15. An example of the procedure performed by the tracked object extraction and light measurement unit 11 is illustrated in FIGS. 5A and 5B. In this example, the center piece of fruit or apple of the image of FIG. 4A is the recognized or tracked object and, as such, is shown as a shaded object in FIG. 5A. The information contained within this shaded area is processed by the unit 11 so as to determine the light measurement or average luminance values as illustrated in FIG. 4B.

Further, in response to the signal S17, the tracked object extraction and light measurement unit 11 may hold the luminance average value S9 of the tracked object in a hold area of the unit 11 and may cause such average value to be supplied to an object recognized color extraction/object recognizing, tracking and light-measuring reference luminance value generating circuit 13 as that a reference luminance value signal S10 may be produced therefrom. Such signal S17, which may represent an average of the luminance of the extracted object prior to auto-tracking, is supplied from the circuit 13 to one terminal of a switch sw4 of the light-measuring method selector 15.

The recognized color extraction and light measurement unit 9 may receive the luminance information da1, the color difference information da2 and da3, and the recognized hue information from the object recognizing and tracking unit 10 as previously described. The unit 9 is adapted to process the received information so as to determine other locations or objects of the respective image (such as that of FIG. 4A) which have hues substantially similar to that of the recognized hue from the unit 10. More specifically, the unit 9 extracts information from the color difference signals R−Y and B−Y so as to determine locations or points having substantially the same hue as the recognized color among the luminance information da1 from the image memory 7, integrates the values of the determined points, averages the integrated values to obtain an averaged value S8, and supplies such average value S8 to one terminal of a switch sw2 of the light measuring method selector 15. To avoid or minimize count errors of the luminance of the same hue of noise component(s) in a black object or an environment color in a white object, black and environment colors may be checked.

An example of the procedure performed by the recognized color extraction and light measurement unit 9 is illustrated in FIGS. 5C and 5D. In this example, the hue or color of the center piece of fruit (or apple) of FIG. 5A is the extracted or recognized color. Accordingly, the unit 9 determines other locations or objects within the image of FIG. 4A having substantially the same hue as that of the apple. As a result, objects such as the three cherries which have substantially the same color as that of the apple are identified or extracted. These objects are shaded in a similar manner to that of the apple as shown in FIG. 5C. The area of the apple having an oval shape which is not shaded represents an area which may be affected by so-called "white saturation" or "black crushing". (White saturation may be caused by over-exposure, whereas black crushing may be caused by under-exposure.) The information contained within the shaded areas of FIG. 5C are processed by the recognized color extraction and light measurement unit 9 so as to determine the light measurement or average luminance values as illustrated in FIG. 5D.

As may be observed from FIGS. 4C, 5B and 5D, the average luminance levels or light values of similar objects (such as the apple) appear slightly different from figure to figure. Such minor discrepancy may be due to somewhat different conditions which may exist when these figures were captured or picked-up (such as different background brightness).

Figure 6:
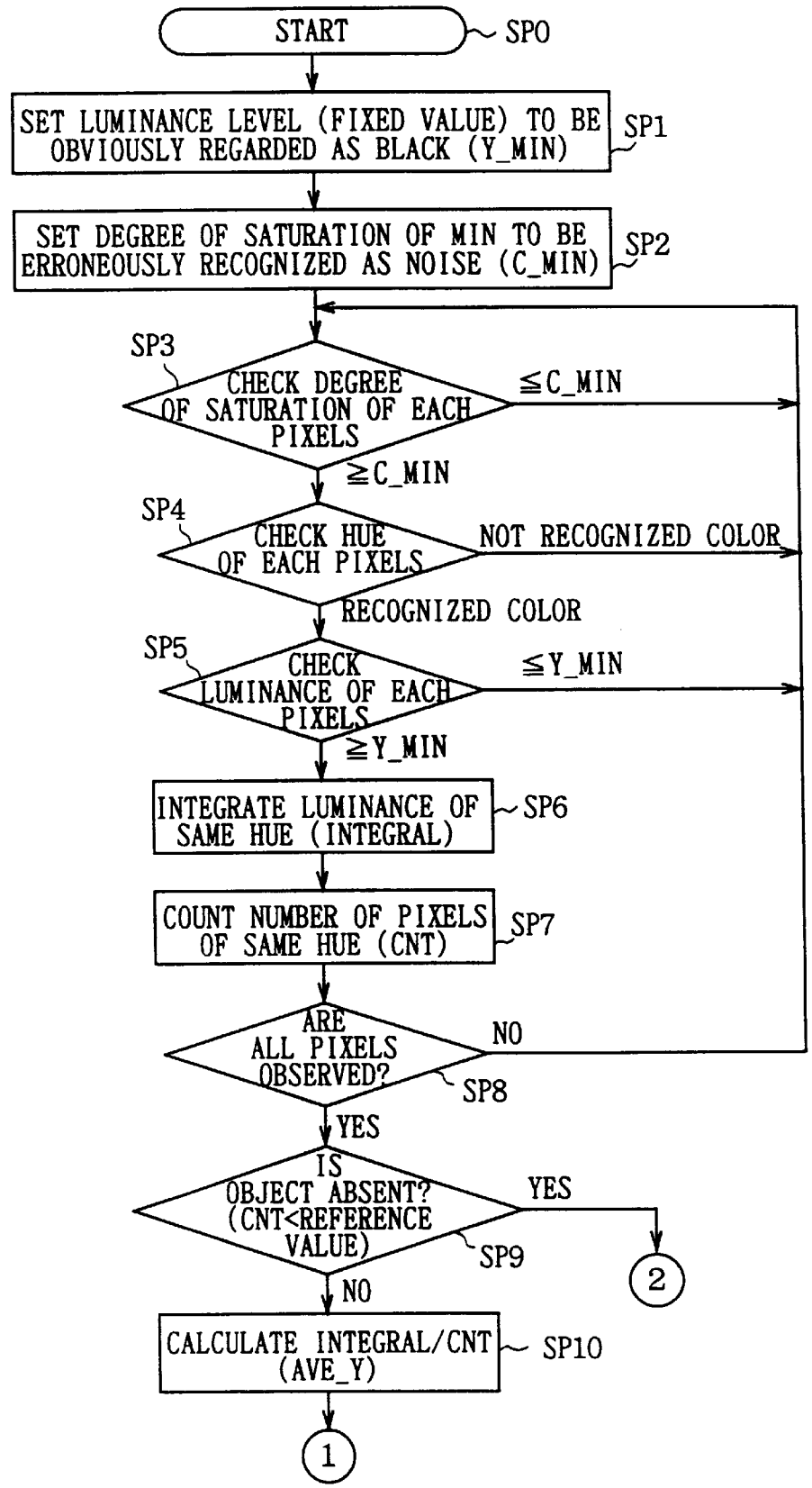
FIGS. 6 and 7 are flow charts to which reference will be made in explaining a recognized color extraction and light measurement procedure.
Figure 7:
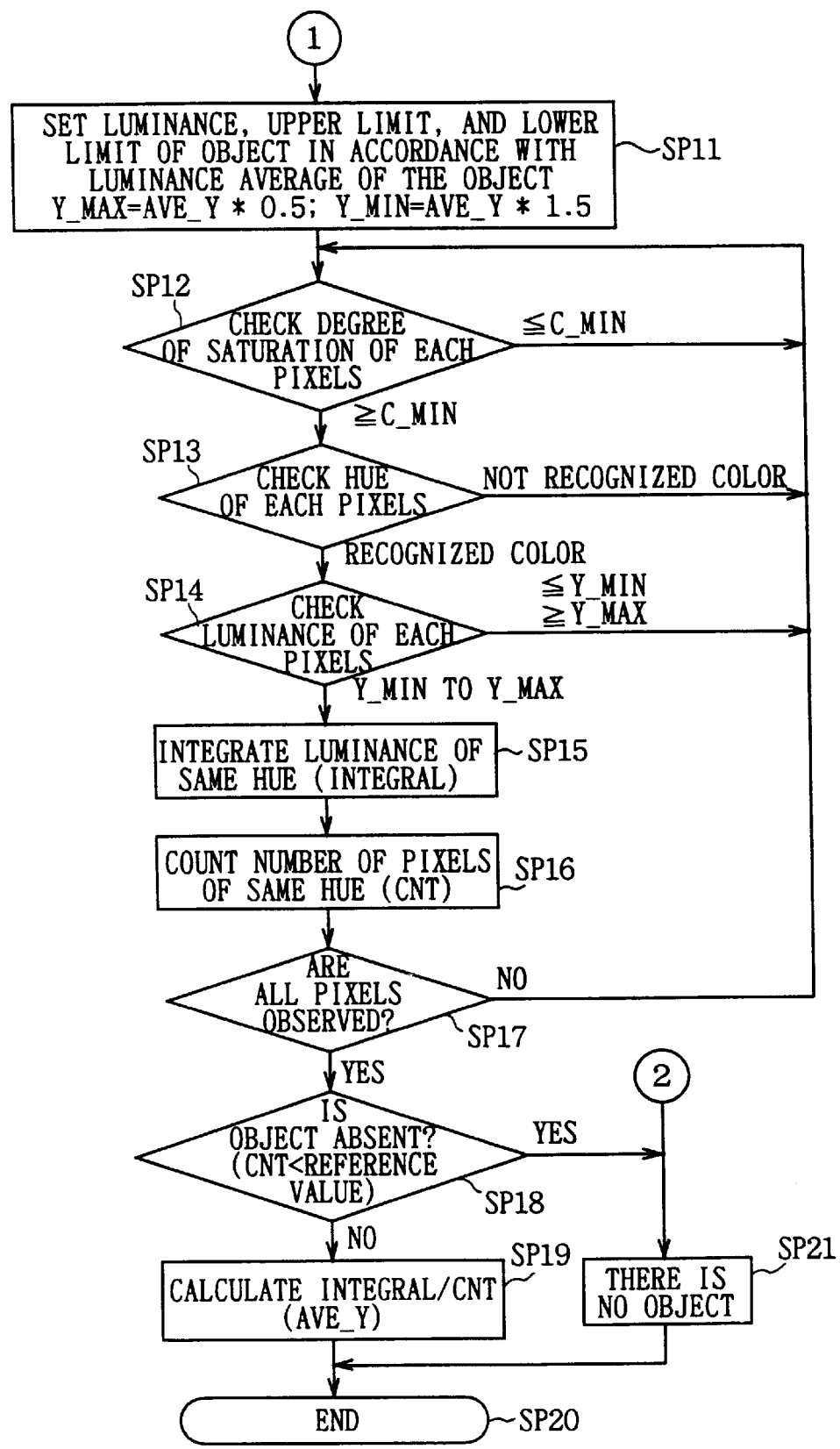

The processing performed by the recognized color extraction and light measurement unit 9 will now be described with reference to the flow chart illustrated in FIGS. 6 and 7. FIG. 6 illustrates the processing in which luminance levels except a black portion and noise are averaged and the presence of an object is determined. FIG. 7 illustrates the processing wherein, in the presence of an object, Ymin/Ymax are set again to calculate Y average.

Processing is initiated in step SP0 and proceeds therefrom to steps SP1 and SP2 wherein a luminance level and a degree of saturation are respectively set. Thereafter, processing proceeds to step SP3 whereupon the degree of saturation of each pixel is checked. If the saturation is less than a predetermined amount, then processing returns to step SP3. If, however, the saturation is more than the predetermined amount, then processing proceeds to step SP4 wherein the hue of each pixel is checked. If the hue is not the recognized color, then processing returns to step SP3. If the hue is the recognized color, then processing proceeds to step SP5 whereat the luminance of each pixel is checked. If the luminance is less than a predetermined amount, then processing returns to step SP3. However, if the luminance is more than the predetermined amount, then processing proceeds to step SP6 whereat the luminance values are integrated. Thereafter, the number of pixels having the same hue are counted at step SP7.

After step SP7, processing proceeds to step SP8, whereupon a determination is made as to whether all the pixels were observed. If such determination is negative, processing returns to step SP3. If, however, this determination is affirmative, processing proceeds to step SP9 wherein a determination is made as to whether the object is present by determining if the count number is less than a reference value.

If the determination in step SP9 is affirmative, processing proceeds to step SP21 wherein it is decided that there was no object. Thereafter, processing is terminated at step SP20.

On the other hand, if the determination in step SP9 is negative, then processing proceeds to step SP10 wherein an average luminance value is calculated. Thereafter, processing proceeds to step SP11, whereupon upper and lower limits of the luminance are set.

From step SP11, processing proceeds through steps SP12–SP19 which, with an exception at step SP14, are similar to steps SP3–SP9 and, as such, will not be further described. At step SP14 the luminance of each pixel is checked. If the luminance is less than a predetermined amount or greater than another predetermined amount, then processing returns to step SP12. If, however, such luminance lies within a predetermined range, then processing proceeds to step SP15.

After step SP19, processing is terminated at step SP20.

Returning to FIG. 1, the tracked object initialization unit 8 produces the signal S17 which may be supplied to the object recognizing and tracking unit 10 and the tracked object extraction and light measurement unit 11 as previously described. Such signal S17 may start and/or stop automatic exposure adjustment and object tracking. The tracked object initialization unit 8 may include a memory switch 18 arranged on the body or housing of the video camera which, upon activating, may cause a signal to be transmitted therefrom which may cause the signal S17 to be produced and/or the previously-mentioned operations to be initiated. Alternatively, a recording start switch of the video camera, a signal from the recording start switch, or a memory switch of a radio or cable remote controller or the like may be utilized instead of the memory switch 18 arranged on the video camera body.

As previously described, the trigger signal S17 may be supplied to the object recognizing and tracking unit 10 so as to cause characteristic values to be extracted and held and the recognized hue to be supplied to the recognized color extraction and light measurement unit 9, and may also be supplied to the tracked object extraction and light measurement unit 11 so as to cause the luminance average value S9 of the tracked object to be held and an object recognized color extraction/object recognizing, tracking and light-measuring reference luminance value signal to be generated.

Additionally, the tracked object initialization unit 8 may generate a signal S19 and may supply the same to the light-measuring method selector 15. Such signal S19 provides an indication of one of a so-called pre-memory, memory and object tracking and exposure adjustment modes and the like to the light-measuring method selector 15. Such modes will be hereinafter more fully described with reference to steps SP31, SP35 and SP41–SP33 of FIG. 8.

As previously described, the light-measuring method selector 15 receives the signal S7 from the centralized light measurement/spot light measurement unit 12, the signal S8 from the recognized color and light measurement unit 9, the signal S9 from the tracked object extraction and light measurement unit 11, and the reference signal S10 from the reference luminance value unit 13. Additionally, the light-measuring method unit 15 receives a reference signal S11 from a centralized light measurement reference luminance value generating circuit 14. In particular, such circuit 14 supplies the signal S11 to one terminal of a switch sw5 of the light-measuring method selector 15. The circuit 14 may include a memory, such as read only memory (ROM), wherein the reference signal S11 is stored.

Accordingly, the light-measuring method selector 15 receives signals S7, S8 and S9 which contain average values of luminance information respectively obtained from units 12, 9 and 10, and the light-measuring method selector 15 further receives reference value signals S10 and S11 from reference luminance value circuits 13 and 14. The light-measuring method selector 15 further receives the signal S19 from the tracked object initialization unit 8, as previously described. In response to the received signals, the light-measuring method selector 15 selects from among the luminance average values S7, S8 and S9 so as to form a selected signal S12, and selects from among luminance reference values S10 and S11 so as to form a selected reference signal S13. Such selection of signals may be performed by the selective opening and/or closing of switches sw1–sw5.

The light-measuring method selector 15 may detect a tracked object unrecognizable or abnormal state in which a tracked object cannot be extracted by the tracked object extraction and light measurement unit 11. Such situation may occur, for example, during a white saturation or black crushing state which may result from a sudden luminance change or the like. In this situation, the light-measuring method selector 15 selects from among the luminance average value signals S7 and S8 from the centralized light measurement unit or spot light measurement unit 12 and the recognized color and light measurement unit 9, and the reference luminance value signals corresponding thereto, as luminance information to obtain or recover an operating state in which exposure may be controlled through tracked object extraction and light measurement.

The light-measuring method selector 15 may further detect a state in which luminance other than that of a tracked object is abnormal, for example, an extreme saturation state or extreme black crushing state. Such situation or state may occur when the tracked object hides or moves off of the screen. In such situation, the light-measuring method selector 15 selects the luminance average value S7 from the centralized light measurement unit or spot light measurement unit 12 and the reference luminance value S11 (which corresponds to the signal S7) as luminance information.

Furthermore, the light-measuring method selector 15 may select the signal S7 from the centralized light measurement unit or spot light measurement unit 12 and the reference luminance value S11 (corresponding to the signal S7) when the selector receives the instruction signal S19 from the tracked object initialization unit 8 prior to the initialization of an object as the luminance information. As a result, the luminance of the object to be recognized and extracted may be adjusted to an optimum exposure.

The light-measuring method selector 15 may further provide a picture information update signal S18 after obtaining light measurement data. Such signal S18 is supplied to the picture information temporary memory 7.

Figure 8:
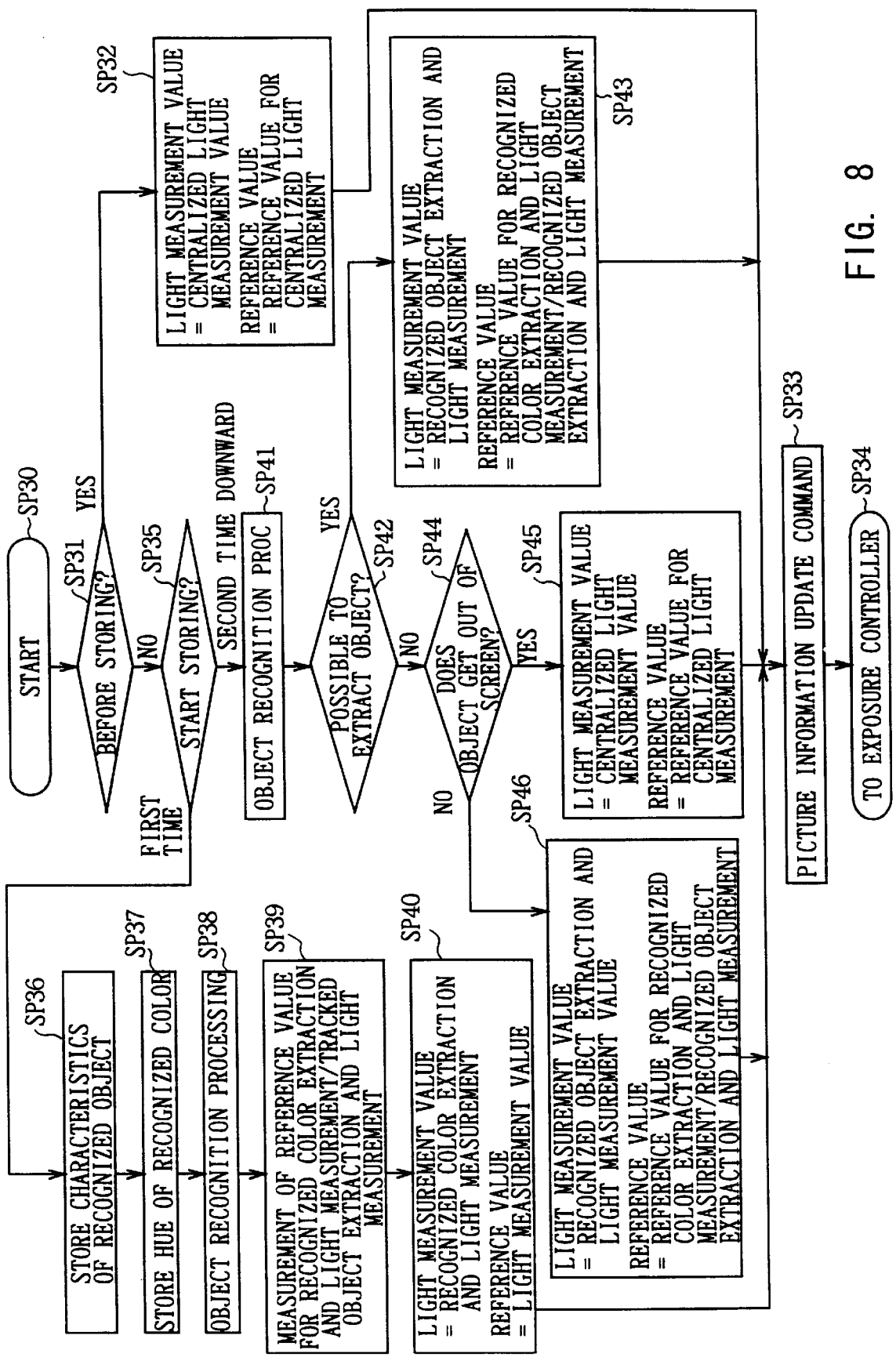
FIG. 8 is a flow chart to which reference will be made in explaining a light-measuring method selection procedure.

The above-mentioned operations performed by the light-measuring method selector 15 will now be further described with reference to the flow chart of FIG. 8.

Processing initially proceeds from step SP30 to step SP31 whereupon a determination is made as to whether storing has begun. If the determination is affirmative, processing proceeds to step SP32 whereupon the light measurement value signal S7 from the unit 12 and the corresponding reference luminance value are selected. Thereafter, processing proceeds to step SP33 whereupon a picture information update signal S18 is generated and supplied to the memory 7.

If, on the other hand, the determination in step SP31 is negative, processing proceeds to step SP35 whereupon a determination is made as to whether it is the first time through such step. If it is the first time, processing proceeds to step SP36 wherein the characteristics of the recognized object are stored. Processing then proceeds to step SP37 wherein the hue of the recognized color is stored. Thereafter, object recognition processing is performed in step SP38. The reference luminance value S10 is formed in step SP39. Processing then proceeds to step SP40 wherein the light measurement value signal S8 from the unit 9 and the corresponding reference luminance value are selected. Thereafter, processing proceeds to step SP33.

If the determination of step SP35 indicates that it is not the first time through, then processing proceeds to step SP41 wherein object recognition processing is performed. Thereafter, processing proceeds to step SP42 whereupon a determination is made as to whether it is possible to extract the desired object. If it is possible, the light measurement value signal S9 and the corresponding reference luminance value are selected in step SP43. Processing then proceeds to step SP33.

If the determination of step SP42 is negative, processing proceeds to step SP44 wherein a determination is made as to whether the object moves off of the screen. If such determination is affirmative, processing proceeds to step SP45 wherein the light measurement value signal S7 and the corresponding reference luminance value are selected. Processing then proceeds to step SP33. If, however, the determination in step SP44 is negative, processing proceeds to step SP46 wherein the light measurement value signal S9 from the unit 11 and the corresponding reference luminance value are selected. Processing then proceeds to step SP33.

Processing proceeds from step SP33 to step SP34, whereupon the selected signals are supplied to the exposure controller 16.

Returning to FIG. 1, the selected signals S12 and S13 from the light-measuring method selector 15 are respectively supplied to positive and negative inputs of a comparator or gain circuit 60 of the exposure controller 16, which may function as an error detector. As a result, the comparator 60 produces a compared or error signal S14 which is supplied to an iris/AGC circuit 61 which, in turn, produces an iris signal S15 and the AGC signal S16. The iris signal S15 is supplied to an iris driver circuit 17 so as to drive the iris, and the AGC signal S16 is supplied to the S/H and AGC circuit 4 as previously described. As a result, the exposure controller 16 may control the luminance and color difference signal generator 6.

Therefore, by extracting only the luminance of an object to be photographed, the present invention enables a light measurement to be obtained without being influenced by the background or other objects. Further, since the present invention enables an object to be light-measured while tracking, a cameraman photographing an object does not have to maintain such object in a light measurement area of a light measurement pattern. Furthermore, the present invention enables light measurement to be performed on the background around the center of an image screen when the object being photographed moves off the screen. As a result, normal luminance may be maintained.

Thus, the present invention provides a video camera which determines a plurality of average values of luminance and a plurality of values of reference luminance values, and which selects therefrom the appropriate average luminance and reference luminance values in accordance with operating conditions. Such selected values are utilized to generate control signals for controlling or adjusting the exposure of the video camera so as to provide automatic and proper exposure control even when photographing under adverse or harsh conditions, such as, when backlight and excessive normal light (spot light) exists which may present serious problems for a conventional video camera.

Although the present video camera was described as having a specific number of measurement units and reference value generating circuits, the present invention is not so limited. Instead, other numbers of such units and reference value generating circuits may be utilized.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. A video camera system, comprising:
   picture information temporary storage means having a temporary memory for dividing a video signal obtained from a video camera into luminance information and color information, and for storing picture information including said luminance information and color information in said temporary memory;

object recognizing and tracking means for recognizing, extracting and tracking a displayed object in accordance with said picture information stored in said temporary memory;

tracked object extraction and light measurement means for extracting and integrating only luminance information of said tracked object so as to calculate a first average value;

recognized color extraction and light measurement means for extracting color information having a same color as said tracked object, and integrating corresponding luminance information so as to calculate a second average value; and exposure control means for controlling an iris and/or an automatic gain controller of said video camera by utilizing said first average value obtained by said tracked object extraction and light measurement means or said second average value obtained by said recognized color extraction and light measurement means and by utilizing a luminance reference value, and for adjusting the luminance of said tracked object so as to be substantially constant.

2. The video camera system according to claim 1, further comprising means for providing a command signal and wherein said tracked object extraction and light measurement means includes means for generating said luminance reference value used for exposure control upon receiving the command signal.

3. The video camera system according to claim 1, wherein said recognized color extraction and light measurement means integrates said luminance information having substantially the same color as a recognized color in said picture information which is other than noise in a black object and environment color in a white object to calculate the second average value.

4. The video camera system according to claim 1, further comprising means for providing a command signal and wherein said recognized color extraction and light measurement means initializes a recognized color in response to the command signal.

5. The video camera system according to claim 1, further comprising a storage switch arranged on said video camera, said storage switch being adapted to initiate and/or terminate exposure operations of said video camera system.

6. The video camera system according to claim 1, further comprising a storage switch arranged on one of a cable and a radio remote control for said video camera, said storage switch being adapted to initiate and/or terminate exposure operations of said video camera system.

7. The video camera system according to claim 1, further comprising a recording start switch of said video camera, said recording start switch being adapted to initiate and/or terminate exposure operations of said video camera system.

8. The video camera system according to claim 1, further comprising a recording start switch arranged on one of a cable and a radio remote control for said video camera, said recording start switch being adapted to initiate and/or terminate exposure operations of said video camera system.

9. A video camera system, comprising:

picture information temporary storage means having a temporary memory for dividing a video signal obtained from a video camera into luminance information and color information, and for storing picture information including said luminance information and color information in said temporary memory;

object recognizing and tracking means for recognizing, extracting and tracking a displayed object in accordance with said picture information stored in said temporary memory;

tracked object extraction and light measurement means for extracting and integrating only luminance information of said tracked object so as to calculate a first average value;

recognized color extraction and light measurement means for extracting color information having a same color as said tracked object, and integrating said corresponding luminance information so as to calculate a second average value;

centralized light measurement means for integrating luminance information of a first area in a center portion of a screen so as to calculate a third average value;

spot light measurement means for integrating luminance information in a second area around the center portion of said screen which is smaller than said first area so as to calculate a fourth average value;

light-measuring method selection means for selecting said first average value obtained by said tracked object extraction and light measurement means, said second average value obtained by said recognized color extraction and light measurement means, said third average value obtained by said centralized light measurement means, or said fourth average value obtained by said spot light measurement means in accordance with an object condition; and exposure control means for controlling an iris and/or an automatic gain controller of said video camera by using the selected luminance average value and a luminance reference value, and for adjusting the luminance of said tracked object so as to be substantially constant.

10. The video camera system according to claim 9, wherein said light-measuring method selection means selects said second average value of said recognized color extraction and light measurement means, said third average value of said centralized light measurement means, or said fourth average value of said spot light measurement means when said tracked object cannot be extracted so as to recover an operating state in which exposure control may be performed by said tracked object extraction and light measurement means.

11. The video camera system according to claim 9, wherein said light-measuring method selection means selects said third average value of said centralized light measurement means or said fourth average value of said spot light measurement means when said tracked object is undetectable on the screen.

12. The video camera system according to claim 9, further comprising means for storing characteristic values of said tracked object and wherein said light-measuring method selection means selects said third average value of said centralized light measurement means or said fourth average value of said spot light measurement means prior to initialization in which the characteristic values are stored in said means for storing characteristic values.

13. A video camera exposure control method, comprising:

dividing a video signal obtained from a video camera into luminance information and color information, and storing picture information including said luminance information and color information in a temporary memory;

recognizing, extracting and tracking a displayed object in accordance with said picture information stored in said temporary memory;

extracting and integrating only luminance information of said tracked object so as to calculate a first average value;

extracting color information having a same color as said tracked object, and integrating corresponding luminance information so as to calculate a second average value; and controlling an iris and/or an automatic gain controller of said video camera by utilizing said first average value or said second average value and by utilizing a luminance reference value, and adjusting the luminance of said tracked object so as to be substantially constant.

14. The video camera exposure control method according to claim 13, wherein the step of extracting only said luminance information of said tracked object includes generating said luminance reference value used for exposure control upon receiving a command signal.

15. The video camera exposure control method according to claim 13, wherein the step of extracting said color information integrates said luminance information having substantially the same color as a recognized color in said picture information which is other than noise in a black object and environment color in a white object to calculate the average value.

16. The video camera exposure control method according to claim 13, wherein the step of extracting said color information initializes a recognized color in response to a command signal.

17. The video camera exposure control method according to claim 13, wherein the video camera includes a storage switch arranged thereon and being adapted to initiate and/or terminate exposure operations of said video camera.

18. The video camera exposure control method according to claim 13, wherein the video camera includes a storage switch arranged on one of a cable and a radio remote control for said video camera, said storage switch being adapted to initiate and/or terminate exposure operations of said video camera system.

19. The video camera exposure control method according to claim 13, wherein the video camera includes a recording start switch of said video camera, said recording start switch being adapted to initiate and/or terminate exposure operations of said video camera system.

20. The video camera exposure control method according to claim 13, wherein the video camera includes a recording start switch arranged on one of a cable and a radio remote control for said video camera, said recording start switch being adapted to initiate and/or terminate exposure operations of said video camera system.

21. A video camera exposure control method, comprising:

dividing a video signal obtained from a video camera into luminance information and color information, and storing picture information including said luminance information and color information in a temporary memory;

recognizing, extracting and tracking a displayed object in accordance with said picture information stored in said temporary memory;

extracting and integrating only luminance information of said tracked object so as to calculate a first average value;

extracting color information having a same color as said tracked object, and integrating said corresponding luminance information so as to calculate a second average value;

integrating said luminance information of a first area in a center portion of a screen so as to calculate a third average value;

integrating said luminance information in a second area around the center portion of said screen which is smaller than said first area so as to calculate a fourth average value;

selecting said first average value, said second average value, said third average value, or said fourth average value in accordance with an object condition; and controlling an iris and/or an automatic gain controller of said video camera by using the selected luminance average value and a luminance reference value, and adjusting the luminance of said tracked object so as to be substantially constant.

22. The video camera exposure control method according to claim 21, wherein the selecting step selects said second average value, said third average value, or said fourth average value when said tracked object cannot be extracted so as to recover an operating state in which exposure control may be performed by the step of extracting and integrating only said luminance information of said tracked object.

23. The video camera exposure control method according to claim 21, wherein the selecting step selects said third average value or said fourth average value when said tracked object is undetectable on the screen.

24. The video camera exposure control method according to claim 21, further comprising the step of storing characteristic values of said tracked object and wherein the selecting step selects said third average value or said fourth average value prior to initialization in which the characteristic values are stored during the storing step.

25. A video camera system, comprising:

picture information temporary storage means having a temporary memory for dividing a video signal obtained from a video camera into luminance information and color information, and for storing picture information including said luminance information and color information in said temporary memory;

object recognizing and tracking means for recognizing, extracting and tracking a displayed object in said picture information stored in said temporary memory;

tracked object extraction and light measurement means for extracting luminance information of said tracked object, for integrating only the extracted luminance information, and for averaging the integrated luminance information so as to produce a first average value;

recognized color extraction and light measurement means for extracting objects having a same color as said tracked object, for integrating corresponding luminance information of said objects, and for averaging the integrated information so as to produce a second average value;

reference generating means for generating reference luminance value signals; and exposure control means for controlling an exposure operation of said video camera by utilizing selected ones of said first and second average values and said luminance reference values so that the luminance of said tracked object is properly adjusted.

26. A video camera system, comprising:

picture information temporary storage means having a temporary memory for dividing a video signal obtained from a video camera into luminance information and color information, and for storing picture information including said luminance information and color information in said temporary memory;

tracked object extraction and light measurement means for extracting luminance information of a tracked object from the picture information stored in said temporary memory, for integrating the extracted luminance information, and for averaging the integrated luminance information so as to produce a first average value;

recognized color extraction and light measurement means for extracting other objects having a same color as said tracked object, for integrating corresponding luminance information of said other objects, and for averaging the integrated information so as to produce a second average value;

centralized light measurement means for integrating luminance information of a first area in a center portion of a screen, and for averaging the integrated luminance information so as to produce a third average value;

reference generating means for generating a plurality of reference luminance value signals;

light-measuring method selection means for selecting (i) one of said first average value from said tracked object extraction and light measurement means, said second average value from said recognized color extraction and light measurement means, and said third average value from said centralized light measurement means, and (ii) one of said reference luminance value signals in accordance with current operating conditions; and exposure control means for controlling an exposure operation of said video camera by utilizing the selected ones of said first, second and third average values and said reference luminance value signals so that the luminance of said tracked object is properly adjusted.

27. A video camera system according to claim 26, further comprising spot light measurement means for integrating luminance information in a second area around the center portion of said screen which is smaller than said first area, and for averaging the integrated information so as to produce a fourth average value.

28. A video camera exposure control method, comprising the steps of;

dividing a video signal obtained from a video camera into luminance information and color information, and for storing picture information including said luminance information and color information in a temporary memory;

recognizing, extracting and tracking a displayed object from said picture information stored in said temporary memory;

extracting luminance information of said tracked object, integrating only the extracted luminance information, and averaging the integrated luminance information so as to produce a first average value;

extracting objects having a same color as said tracked object, integrating corresponding luminance information of said objects, and averaging the integrated information so as to produce a second average value;

generating reference luminance value signals; and controlling an exposure operation of said video camera by utilizing selected ones of said first and second average values and said reference luminance value signals so that the luminance of said tracked object is properly adjusted.

29. A video camera exposure control method, comprising the steps of:

dividing a video signal obtained from a video camera into luminance information and color information, and storing picture information including said luminance information and color information in a temporary memory;

extracting luminance information of a tracked object from the picture information stored in said temporary memory, integrating the extracted luminance information, and averaging the integrated luminance information so as to produce a first average value;

extracting other objects having a same color as said tracked object, integrating corresponding luminance information of said other objects, and averaging the integrated information so as to produce a second average value;

integrating luminance information of a first area in a center portion of a screen, and averaging the integrated luminance information so as to produce a third average value;

generating a plurality of reference luminance value signals;

selecting (i) one of said first average value, said second average value and said third average value, and (ii) one of said reference lumninance value signals in accordance with current operating conditions; and controlling an exposure operation of said video camera by utilizing the selected ones of said first, second and third average values and said reference luminance value signals so that the luminance of said tracked object is properly adjusted.

30. The video camera exposure control method according to claim 29, further comprising the step of integrating said luminance information in a second area around the center portion of said screen which is smaller than said first area, and averaging the integrated luminance information so as to produce a fourth average value.

* * * * *